United States Patent
Mihara

(10) Patent No.: US 7,460,597 B2
(45) Date of Patent: Dec. 2, 2008

(54) ENCODING APPARATUS AND METHOD

(75) Inventor: Kanji Mihara, Kanagawa (JP)

(73) Assignee: Sony Corporation, Tokyo (JP)

( * ) Notice: Subject to any disclaimer, the term of this patent is extended or adjusted under 35 U.S.C. 154(b) by 704 days.

(21) Appl. No.: 11/077,738

(22) Filed: Mar. 10, 2005

(65) Prior Publication Data

US 2005/0169547 A1    Aug. 4, 2005

Related U.S. Application Data

(63) Continuation of application No. 09/397,703, filed on Sep. 16, 1999, now Pat. No. 6,928,113.

(30) Foreign Application Priority Data

Sep. 18, 1998    (JP)    ............... 10-264195

(51) Int. Cl.
*H04N 7/12* (2006.01)
*G06K 9/36* (2006.01)

(52) U.S. Cl. ............... 375/240.05; 382/251
(58) Field of Classification Search ............ 375/240.05, 375/240.03, 240.2, 240.17; 382/251; 386/113
See application file for complete search history.

(56) References Cited

U.S. PATENT DOCUMENTS

| | | | |
|---|---|---|---|
| 5,461,682 A | | 10/1995 | Nomura |
| 5,488,419 A | * | 1/1996 | Hui et al. .............. 375/240.17 |
| 5,737,481 A | * | 4/1998 | Gushima et al. ............ 386/113 |
| 5,881,177 A | * | 3/1999 | Kim ........................... 382/251 |
| 6,025,878 A | | 2/2000 | Boyce et al. |
| 6,092,920 A | | 7/2000 | Sakamoto |
| 6,249,614 B1 | | 6/2001 | Kolesnik et al. |

FOREIGN PATENT DOCUMENTS

| | | |
|---|---|---|
| EP | 0 735 771 | 10/1996 |
| EP | 0 740 472 | 10/1996 |
| EP | 0 784 410 | 7/1997 |
| EP | 0 944 261 | 9/1999 |
| WO | WO 98 35503 | 8/1998 |

* cited by examiner

*Primary Examiner*—Gims S Philippe
(74) *Attorney, Agent, or Firm*—Frommer Lawrence & Haug LLP; William S. Frommer

(57) ABSTRACT

An encoding apparatus and method prevents image deterioration generated by repeatedly performing encoding and decoding by using a quantization matrix for quantization which is different from a quantization matrix for inverse quantization. In the encoding apparatus, a matrix selector selects a first quantization matrix in accordance with the complexity of an encoded picture pattern, and supplies a quantizer with information on the selected first quantization matrix. A matrix unit rewrites, by information on a second quantization matrix, the information described in an encoded stream output from a variable length code unit so that a quantization matrix to be used for inverse quantization is a second quantization matrix different from the first quantization matrix.

2 Claims, 11 Drawing Sheets

FIG. 4

| 8  | 16 | 19 | 21 | 24 | 25 | 26 | 30 |
|----|----|----|----|----|----|----|----|
| 16 | 16 | 21 | 22 | 25 | 26 | 30 | 33 |
| 19 | 21 | 24 | 25 | 26 | 30 | 30 | 34 |
| 21 | 21 | 24 | 25 | 26 | 30 | 33 | 35 |
| 21 | 24 | 25 | 26 | 29 | 31 | 35 | 42 |
| 24 | 25 | 26 | 29 | 31 | 35 | 42 | 50 |
| 24 | 25 | 26 | 30 | 34 | 40 | 48 | 58 |
| 25 | 26 | 31 | 34 | 40 | 48 | 58 | 70 |

FIG. 5

| 8  | 16 | 19 | 21 | 24 | 25 | 26 | 31  |
|----|----|----|----|----|----|----|-----|
| 16 | 16 | 21 | 22 | 25 | 26 | 31 | 40  |
| 19 | 21 | 24 | 25 | 26 | 31 | 31 | 45  |
| 21 | 21 | 24 | 25 | 26 | 31 | 40 | 51  |
| 21 | 24 | 25 | 26 | 30 | 33 | 51 | 84  |
| 24 | 25 | 26 | 30 | 33 | 51 | 84 | 100 |
| 24 | 25 | 26 | 31 | 45 | 80 | 96 | 116 |
| 25 | 26 | 33 | 45 | 80 | 96 | 116| 140 |

| 8 | 16 | 19 | 21 | 24 | 26 | 27 | 36 |
| 16 | 16 | 21 | 22 | 26 | 27 | 36 | 54 |
| 19 | 21 | 24 | 26 | 27 | 36 | 36 | 62 |
| 21 | 21 | 24 | 26 | 27 | 36 | 54 | 70 |
| 21 | 24 | 26 | 27 | 32 | 41 | 70 | 84 |
| 24 | 26 | 27 | 32 | 41 | 70 | 84 | 100 |
| 24 | 26 | 27 | 36 | 62 | 80 | 96 | 116 |
| 26 | 27 | 41 | 62 | 80 | 96 | 116 | 140 |

FIG. 11
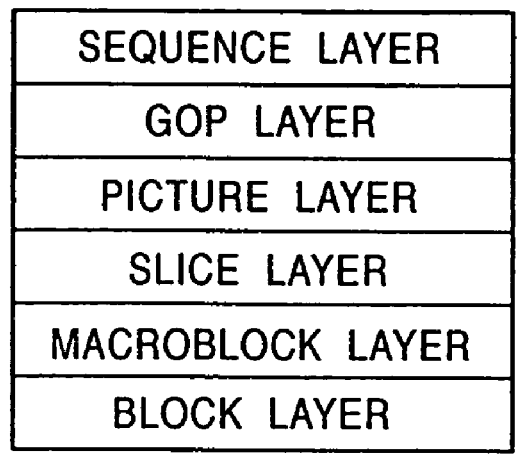
FIG. 12

ENCODING APPARATUS AND METHOD

This is a continuation of application Ser. No. 09/397,703, filed Sep. 16, 1999, now U.S. Pat. No. 6,928,113, the entirety of which is incorporated herein by reference.

BACKGROUND OF THE INVENTION

1. Field of the Invention

The present invention relates to encoding apparatuses and methods for encoding video data, and in particular, to an encoding apparatus and method that uses different quantization matrices for quantization and inverse quantization, whereby, when quantization and inverse quantization are repeatedly performed, image-quality deterioration in video data can be prevented.

2. Description of the Related Art

In the field of video-data recording and reproduction in videocassette recorders and video servers for broadcasting stations and practical use, it has become common, with the establishment of compression encoding based on the moving picture experts group two (MPEG-2) standard, that video data compressed based on the MPEG-2 standard are recorded and reproduced.

FIG. 1 shows the structure of a general encoder 10 that performs compression encoding. As shown in FIG. 1, in an encoder 10, image signals are input to a scanning-conversion macroblock generator 11. The scanning-conversion macroblock generator 11 converts the units of the image signals from fields into frames, and generates the order of macroblocks having 16×16 pixels by performing conversion based on the order of scanning lines. An adder 12 adds, in units of 8×8 pixel blocks (DCT blocks) constituting the macroblocks, the signals in the macroblock units and prediction signals output from a motion compensator 21, and inputs the sums to a discrete cosine transform (DCT) unit 13.

The DCT unit 13 computes DCT coefficients by performing discrete cosine transform processing for each block. The DCT coefficients are input to a quantizer 14. By dividing each input DCT coefficient by the product of a quantization index signal output from a rate controller 17 and a predetermined quantization matrix, each coefficient is quantized. The quantization results are output from the quantizer 14, while being zigzag-scanned. The output quantized data are input to a variable length code (VLC) unit 15. After the data are transformed into variable length codes, they are output as a stream via an output buffer 16. The amount of the generated codes of the stream is input to the rate controller 17, and it computes quantization indices to be output to the quantizer 14.

For the generation (partial decoding) of prediction signals, the quantized data output from the quantizer 14 are inverse-quantized by an inverse quantizer 18. The inverse DCT of the inverse-quantized data is performed by an inverse DCT unit 19, and the obtained data are input to an adder 20. The adder 20 adds outputs from the inverse DCT unit 19 and motion compensation predicting signals output from a motion compensator 21, and inputs and stores the sums in the motion compensator 21. A motion predictor 22 generates motion vectors based on outputs from the scanning-conversion macroblock generator 11, and outputs them to the motion compensator 21. The motion compensator 21 generates, based on the motion vectors, motion compensation predicting signals for partially decoded image data.

The signals encoded (compressed) by the encoder 10 are decoded by a decoder 30 as shown in FIG. 2. In other words, the stream is input to a variable length decoder (inverse VLC unit) 32 via an input buffer 31. After decoding the input stream, the variable length decoder 32 outputs image signal components to an inverse quantizer 33, and outputs motion vectors to a motion compensator 37. The inverse quantizer 33 transforms the input image signal components into DCT coefficients in accordance with an inverse quantization matrix. An inverse DCT unit 34 implements inverse DCT of the DCT coefficients, and the motion compensator 37 generates prediction signals by performing motion compensation for the already decoded image signals in accordance with the motion vectors. Outputs from the inverse DCT unit 34 are input to an adder 35, and are added to the prediction signal output from the motion compensator 37, whereby decoding is performed. The decoded signals are output and stored in the motion compensator 37, and are output to a format converter 36. The format converter 36 converts the decoded signals in units of macroblocks into image signals in units of scanning lines.

In order that information on the quantization matrix used in the quantizer 14 may be used for inverse quantization by the inverse quantizer 33 in the decoder 30, the information is described in a stream quantized in the output stage of the quantizer 14. This is because in the MPEG standard, syntax for describing quantization matrices is defined. When the decoder 30 decodes the encoded stream, the inverse quantizer 33 performs inverse quantization by using the quantized matrix information described in codes. In other words, in general encoding and decoding based on the MPEG standard, the quantization matrices used by the quantization unit 14 and the inverse quantization matrices used by the inverse quantization 33 are completely the same.

In ordinary editing performed in broadcasting stations and video productions, a plurality of source video data are repeatedly processed by using editing processes such as synthesizing and special effects, whereby edited video data are generated. In other words, in order to generate edited video data, recording to and reproduction from a recording medium must be repeatedly performed. As a result, encoding by the encoder 10 and decoding by the decoder 30 are repeatedly performed. This accumulates image distortions caused by quantization errors generated in image quantization and inverse quantization, which may cause great image deterioration.

The reason that the image quality deteriorates due to noise accumulated with repeated implementation of the MPEG encoding and decoding is described below.

The concept of the ordinary quantizer 14 and the concept of the inverse quantizer 33 are simply described. Each of the quantized data output from the quantizer 14 is expressed by the following expression:

$$Q\_data = DCT\_coefficient/(Q\_coefficient \times Q\_step) \qquad (1)$$

where "Q_data" represents each of the quantized data output from the quantizer 14, "DCT_coefficient" represents a DCT coefficient that is output from the DCT unit 13 and that is supplied to the quantizer 14, "Q_coefficient" represents a quantization coefficient in the quantization matrix supplied to the quantizer 14, and "Q_step" represents the quantization step supplied from the rate controller 17 to the quantizer 14. In other words, each of the quantized data output from the quantizer 14 is a value obtained by dividing the DCT coefficient by the product of the quantization coefficient and the quantization step. For example, in the case where the product of the quantization coefficient and the quantization step is 100, the quantizer 14 outputs values divided by 100 as quantized data.

The inverse quantizer 33 in the decoder 30 performs processing, which is inverse to that performed by the quantizer 14, on the DCT coefficient supplied from the variable length decoder 32. A DCT coefficient "DCT_coefficient" output from the inverse quantizer 33 is expressed by the following expression:

$$DCT\_coefficient = Q\_data \times (Q\_coefficient \times Q\_step) \quad (2)$$

In other words, the DCT coefficient "DCT_coefficient" is a value obtained by multiplying the DCT coefficient by the quantization coefficient and the quantization step. Referring to the above-described example, in the case where the product of the quantization coefficient and the quantization step is 100, the inverse quantizer 33 outputs values multiplied by 100 as DCT coefficients.

Although it may be said that the inverse quantization based on the expression (2) is a process for restoring the quantization performed based on the expression (1), complete restoration of 100 percent is not performed. This is because the figures after the decimal point in the data computed based on the expression (1) are canceled and not transmitted to the decoder 30. Therefore, errors generated between the quantization computation and the inverse quantization computation are included as noise in the decoded video data.

In encoding and decoding based on the MPEG standard, more encoding bits are assigned to noises having high spatial frequency than to video components having a plain video image. Thus, an encoded stream generated by the encoding has more noises than those of source video data. The main cause of image quality deterioration is that noises (called "mosquito noise") having high frequency components increase.

Subsequently, the inverse quantizer 33 processes the encoded stream including the noises by using the inverse quantization based on the expression (2). The inverse quantizer 33 inverse-quantizes not only the video components of the encoded stream but also the noise components. Thus, also the noise components are restored, similarly to the video components. Obviously, the restored noise components are larger than the noise components included in the source video data before being encoded.

Accordingly, in repeated implementation of the encoding and decoding based on an ordinary MPEG standard, noises accumulate that are generated by computation errors occurring between the quantization and the inverse quantization, which causes image quality deterioration in the decoded video data. In addition, in the ordinary inverse quantization based on the MPEG standard, a problem occurs in that image quality deteriorates because not only video components included in the encoded stream, but also noise components are inverse-quantized.

SUMMARY OF THE INVENTION

Accordingly, the present invention has been made in view of the foregoing circumstances.

It is an object of the present invention to provide an encoding apparatus and an encoding method that prevent image quality from deteriorating by using a quantization matrix for quantization which is different from a quantization matrix for inverse quantization. Specifically, the encoding apparatus and the encoding method suppress components having high spatial frequencies, such as noise, by setting, in a quantization matrix for quantization, quantization coefficients for quantizing DCT coefficients having relatively high spatial frequencies to be greater than those for inverse quantization.

To this end, according to an aspect of the present invention, the foregoing object is achieved through provision of an encoding apparatus for encoding source video data that includes a discrete-cosine-transform unit for outputting discrete-cosine-transform coefficients by implementing discrete-cosine-transform processing on the source video data, a quantization unit for outputting quantized data by using a quantization matrix to quantize the discrete-cosine-transform coefficients, and an encoding unit for outputting an encoded stream by encoding the quantized data. The quantization matrix for quantization has discrete-cosine-transform coefficients different from those in a quantization matrix used when inverse quantization in decoding is implemented.

Preferably, the values of quantization coefficients for quantizing high-spatial-frequency discrete-cosine-transform coefficients in the quantization matrix for quantization are greater than the values of quantization coefficients for quantizing high-spatial-frequency discrete-cosine-transform coefficients in the quantization matrix used when inverse quantization is implemented.

As the spatial frequencies of the discrete-cosine-transform coefficients increase, the values of the quantization coefficients in the quantization matrix for quantization may increase to be greater than the values of the quantization coefficients in the quantization matrix used when inverse quantization is implemented.

The encoding apparatus may further include a control unit for selecting a quantization matrix to be supplied to the quantization unit, based on the amount of codes generated from the encoded stream output from the encoding unit.

The control unit may select, in proportion to the number of spatial frequency components of a picture encoded by the encoding unit, a quantization matrix having higher quantization coefficients.

The encoding apparatus may further include a control unit for determining, based on the amount of codes generated from the encoded stream output from the encoding unit, the level of complexity representing the complexity of an encoded picture before selecting, based on the determined level of complexity, a quantization matrix to be supplied to the quantization unit.

The encoding apparatus may further include a control unit for performing the computation of the mean of quantization indices used by the quantization matrix for quantization, the determination of the level of complexity representing the complexity of an encoded picture, based on the computed mean, and the selection of a quantization matrix to be supplied to the quantization unit, based the determined level of complexity.

The level of complexity may be determined based on hysteresis characteristics, from the mean of the quantization indices.

The encoding apparatus may further include a rewriting unit for performing rewriting so that data of a quantization matrix which are described in the encoded stream output from the encoding unit are changed into data of the quantization matrix used when the inverse quantization is implemented.

According to another aspect of the present invention, the foregoing object is achieved through provision of an encoding method for encoding source video data that includes the steps of outputting discrete-cosine-transform coefficients by implementing discrete-cosine-transform processing on the source video data, outputting quantized data by using a quantization matrix to quantize the discrete-cosine-transform coefficients, and outputting an encoded stream by encoding the quantized data. The quantization matrix for quantization has discrete-cosine-transform coefficients different from those in a quantization matrix used when inverse quantization is implemented in decoding.

According to still another aspect of the present invention, the foregoing object is achieved through provision of an encoding apparatus for encoding source video data that includes a quantization unit for using a first quantization matrix to quantize the source video data, an encoding unit for encoding the quantized data from the quantization unit, and a description unit for describing, in a stream encoded by the quantization unit, data on a second quantization matrix having quantization coefficients different from quantization coefficients in the first quantization matrix, without describing data on the first quantization matrix.

According to a further aspect of the present invention, the foregoing object is achieved through provision of an encoding method for encoding source video data that includes the steps of using a first quantization matrix to quantize the source video data, encoding the quantized data, and describing, in a stream of the encoded data, data on a second quantization matrix having quantization coefficients different from quantization coefficients in the first quantization matrix, without describing data on the first quantization matrix.

According to a still further aspect of the present invention, the foregoing object is achieved through provision of an encoding apparatus for encoding source video data that includes a quantization unit for quantizing the source video data, an encoding unit for encoding the quantized data from the quantization unit, and a control unit for selecting, as a quantization matrix used by the quantization unit, a quantization matrix having quantization coefficients different from those in a quantization matrix to be used for decoding.

According to yet another aspect of the present invention, the foregoing object is achieved through provision of an encoding method for encoding source video data that includes the steps of quantizing the source video data, encoding the quantized data, and selecting, as a quantization matrix used by the quantization unit, a quantization matrix having quantization coefficients different from those in a quantization matrix to be used for decoding.

According to a more aspect of the present invention, the foregoing object is achieved through provision of an encoding apparatus for encoding source video data that includes a quantization unit for quantizing the source video data, an encoding unit for encoding the quantized data from the quantization unit, and a control unit for controlling the quantization unit so that in quantization by the quantization unit, a quantization matrix different from a quantization matrix to be used for decoding is used.

According to a still more aspect of the present invention, the foregoing object is achieved through provision of an encoding apparatus for encoding source video data that includes a quantization unit for quantizing the source video data, an encoding unit for encoding the quantized data from the quantization unit, and a processing unit for processing a stream of the encoded data so that a quantization matrix to be used for inverse quantization differs from a quantization matrix used in the quantization unit.

BRIEF DESCRIPTION OF THE DRAWINGS

FIG. 4 is an illustration of a first quantization matrix;

FIG. 5 is an illustration of a second quantization matrix;

FIG. 11 is an illustration of an encoded bit stream;

FIG. 12 is an illustration of a sequence layer in an encoded bit stream;

DESCRIPTION OF THE PREFERRED EMBODIMENTS

Figure 3:
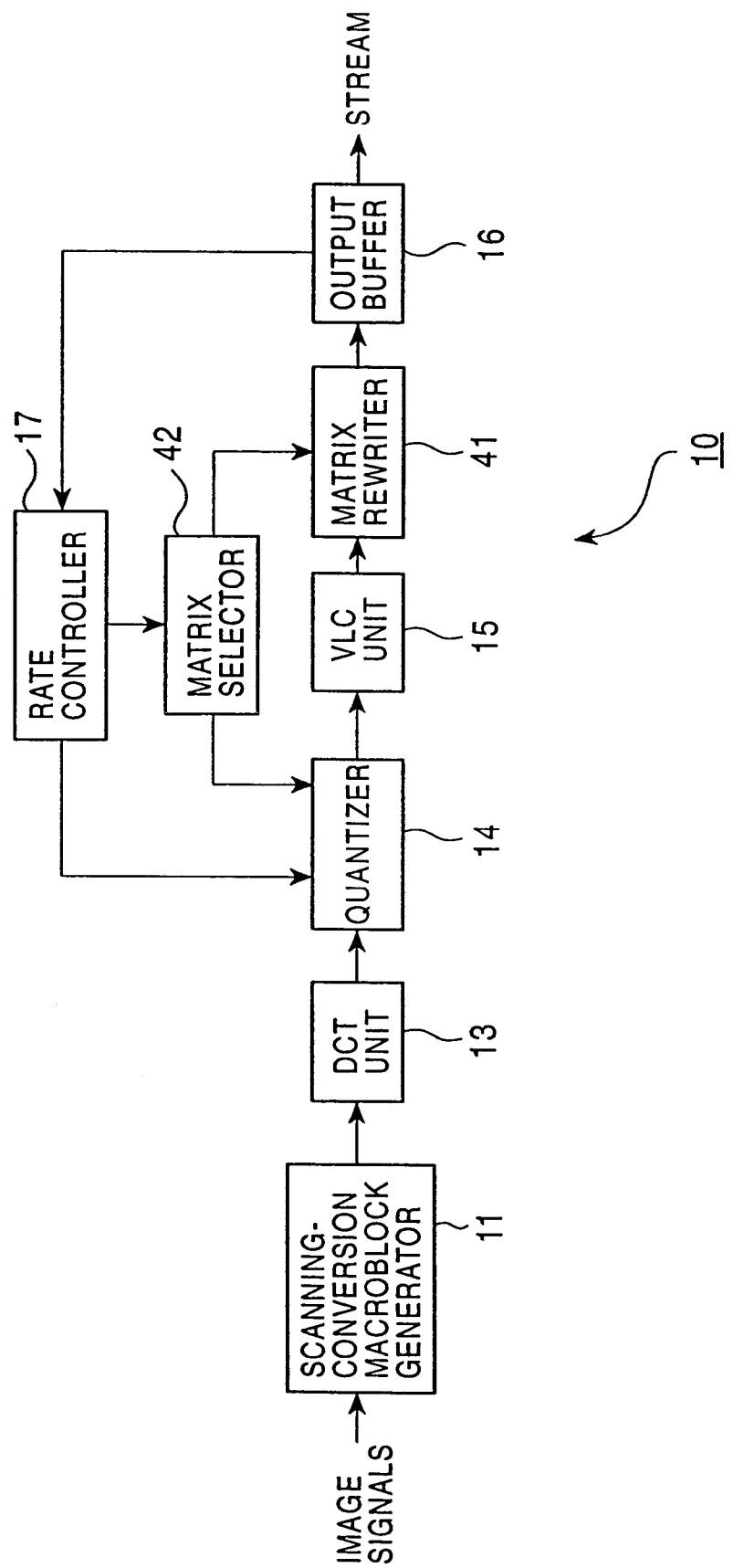
FIG. 3 is a block diagram showing an encoder 10 according to an embodiment of the present invention.

Referring to the block diagram shown in FIG. 3, an encoder 10 according to an embodiment of the present invention includes a scanning-conversion macroblock generator 11, a DCT unit 13, a quantizer 14, a VLC unit 15, a matrix unit 41, an output buffer 16, a rate controller 17, and a matrix selector 42. Although in the encoder 10 shown in FIG. 3, a motion-compensation control function (the adder 12, the inverse quantizer 18, and the motion compensator 22) as shown in FIG. 1 is omitted for simplicity of description, the encoder 10 shown in FIG. 3 actually has the function.

Figure 1:
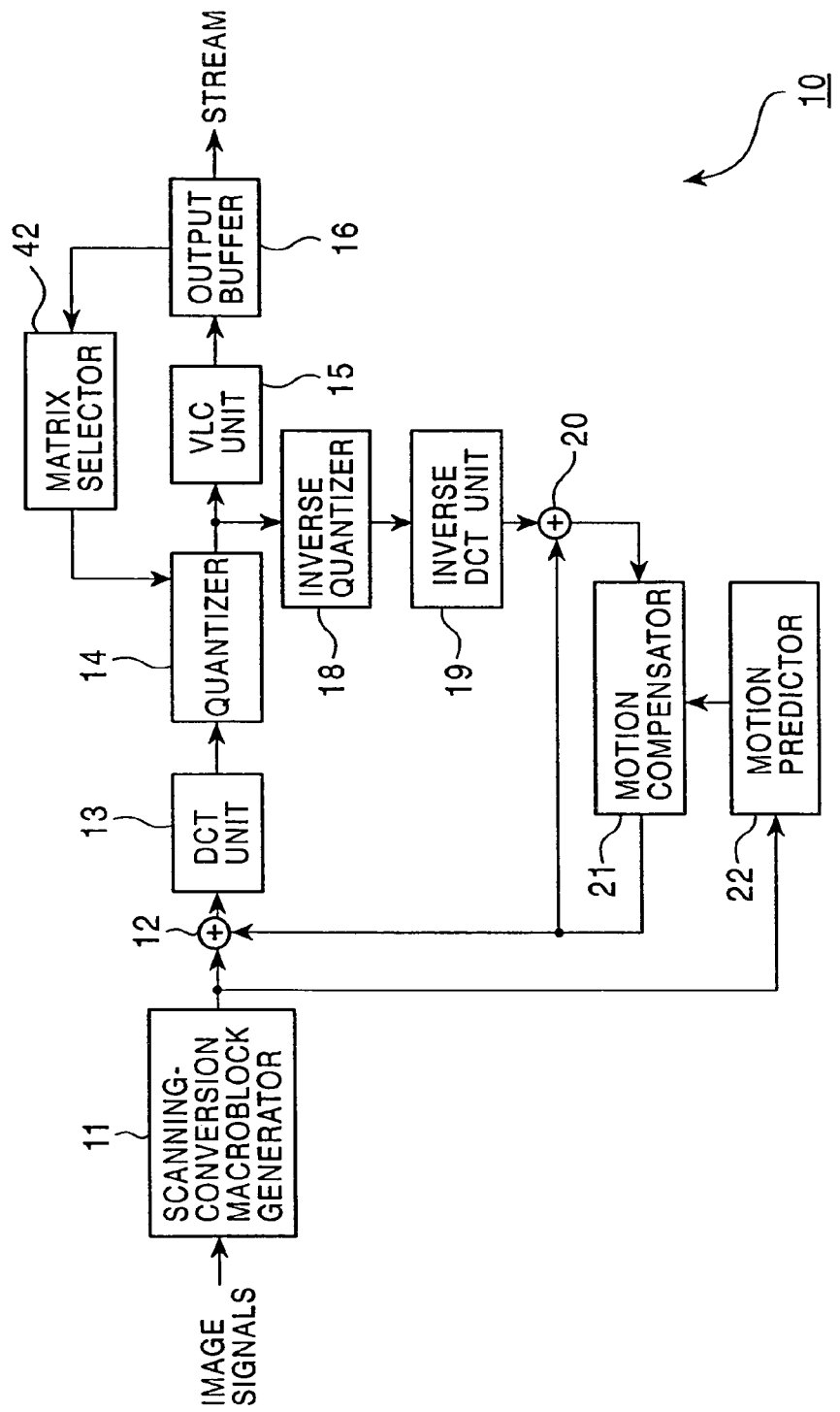
FIG. 1 is a block diagram showing a general encoder 10.

The encoder 10 shown in FIG. 3 differs from the encoder shown in FIG. 1 in that the encoder 10 shown in FIG. 3 includes the matrix selector 42, which selects a quantization matrix described in an encoded stream, and the matrix unit 41, which rewrites the quantization matrix, so that a quantization matrix used by the quantizer 14 and a quantization matrix used by the inverse quantizer 33 (shown in FIG. 2) are different.

The matrix unit 41 has a function of rewriting a quantization matrix described in an encoded stream output from the VLC unit 15 with a quantization matrix having quantization coefficients less than quantization coefficients in the quantization matrix used by the quantizer 14. The new quantization matrix for rewriting is determined based on quantization indices input from the rate controller 17. The quantization indices are the main factor for determining the above-described quantization step. As the quantization indices are greater, the quantization step decreases, while as the quantization indices are smaller, the quantization step increases. The matrix selector 42 controls, based on the quantization indices, the values of the quantization matrix used by the quantizer 14.

In the case where image noise, caused by quantization transformation errors generated in computation for quantization and inverse quantization of video data, increases, the matrix unit 41 sets a quantization matrix different from the quantization matrix used in the quantizer 14, as a quantization matrix to be used in the inverse quantizer 33 (FIG. 2) of the decoder 30 (The high frequency components of the quantization matrix used in the quantizer 14 are set to have values greater than the high frequency components of the quantization matrix used in the inverse quantizer 33). The other components are identical to those shown in FIG. 1.

Figures 6, 7:
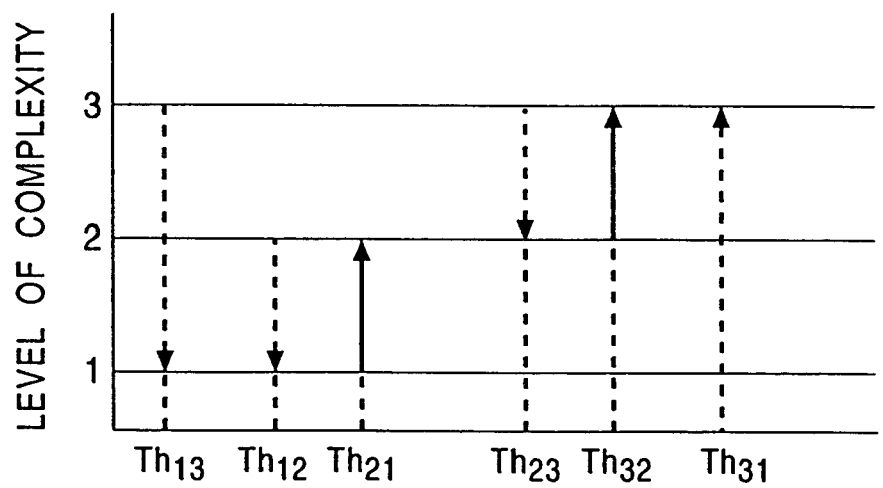
FIG. 6 is an illustration of a third quantization matrix.
FIG. 7 is a graph illustrating the function of determining the change of quantization matrices.

With reference to FIGS. 4 to 6, specific quantization matrices are described below.

The quantizer 14 uses any one of the first, second, and third quantization matrices shown in FIGS. 4 to 6. The inverse quantizer 33 uses the first quantization matrix shown in FIG. 4. Among the values of the quantization matrix in FIG. 5, components of low spatial frequencies that are not shaded are the same as the values of the first quantization matrix shown in FIG. 4, and components of intermediate and high spatial frequencies that are thinly shaded are greater than the values of the quantization indices in the first quantization matrix shown in FIG. 4. In the third quantization matrix shown in FIG. 6, the values of quantization coefficients having intermediate and high spatial frequencies are greater than quantization coefficients in the second quantization matrix, and are wider than the thinly shaded range shown in FIG. 5.

The rate controller 17 receives, from the output buffer 16, information on the amount of generated bits, and computes, based on the amount of generated bits, the mean of quantization indices. The information on the amount of generated bits is supplied to the rate controller 17 whenever one picture is encoded. The information on the amount of generated bits is used as an indicator to determine whether the encoded picture was complex or plain.

A relatively small mean of the quantization indices shows that the picture pattern of source video data is relatively simple and that the mean of spatial frequencies in the picture frame of the source video data is low. The case where the picture pattern of the source video data is in this condition is defined as "complexity level 1".

An intermediate mean of the quantization indices shows that the picture pattern of the source video data is neither simple nor complex, i.e., ordinary, and that the mean of spatial frequencies in the picture frame of the source video data is intermediate. The case where the picture pattern of the source video data is in this condition is defined as "complexity level 2".

A very large mean of the quantization indices shows that the picture pattern of the source video data is very complex and that the mean of spatial frequencies in the picture frame of the source video data is very high. The case where the picture pattern of the source video data is in this condition is defined as "complexity level 3".

The rate controller 17 receives, from the output buffer 16, the information on the amount of generated bits whenever one picture is encoded, and computes, based on the amount of generated bits, the mean of quantization indices. The rate controller 17 determines one of the above-described complexity levels by comparing the computed mean of rate quantization indices and a predetermined threshold value. Specifically, when the picture pattern of the encoded picture is simple, the rate controller 17 determines complexity level 1. When the picture pattern of the encoded picture is ordinary, the rate controller 17 determines complexity level 2. When the picture pattern of the encoded picture is complex, the rate controller 17 determines complexity level 3. Information on the complexity levels is supplied to the matrix selector 42.

The rate controller 17 also determines, based on the amount of generated bits, the quantization step whenever one picture is encoded. Specifically, when the amount of generated codes for one picture is greater than a predetermined amount, or the amount of data stored in the output buffer 16 increases, the rate controller 17 increases the quantization step so as to suppress the amount of generated codes for the subsequent pictures. When the amount of generated codes for one picture is less than the predetermined amount, or the amount of data stored in the output buffer 16 decreases, the rate controller 17 reduces the quantization step so as to increase the amount of generated codes for the subsequent pictures. Information on the quantization step, determined by the rate controller 17, is supplied to the quantizer 14.

The matrix selector 42 includes a memory storing the first, second, and third quantization matrices shown in FIGS. 4 to 6. The matrix selector 42 receives the information on the complexity level from the rate controller 17, and selects, in accordance with the complexity level, from among the first, second, and third quantization matrices stored in the memory, a quantization matrix to be supplied to the quantizer 14.

Control operations in complexity levels 1, 2, and 3, are described below in order.

In the case of complexity level 1, the matrix selector 42 selects and supplies the first quantization matrix (shown in FIG. 4) to the quantizer 14. The matrix selector 42 also supplies information on the first quantization matrix, as a quantization matrix to be used for inverse quantization, to the matrix unit 41. The quantizer 14 performs quantization by using the first quantization matrix supplied from the matrix selector 42.

The matrix unit 41 rewrites the quantization matrix information described in the encoded stream output from the VLC unit 15 by the first quantization matrix information supplied from the matrix selector 42. Obviously, in this case (in complexity level 1), the quantization matrix information described in the encoded stream output from the VLC unit 15 is the first quantization matrix information. Accordingly, the quantization matrix information described in the encoded stream output from the VLC unit 15 may be output to be unchanged without being rewritten.

As a result of encoding, in the encoded stream to be supplied to the decoder 30, information on a quantization matrix identical to the first quantization matrix used by the quantizer 14. Accordingly, the inverse quantizer 33 uses the first quantization matrix to inverse-quantize data processed by performing variable length decoding in the variable length decoder 32. The quantization matrix used by the inverse quantizer 33 is identical to the first quantization matrix used by the quantizer 14.

In the case of complexity level 2, the matrix selector 42 selects and supplies the second quantization matrix (shown in FIG. 5) to the quantizer 14. The matrix selector 42 also supplies information on the first quantization matrix, as a quantization matrix to be used for inverse quantization, to the matrix unit 41. The quantizer 14 performs quantization by using the second quantization matrix supplied from the matrix selector 42.

The matrix unit 41 rewrites the quantization matrix information described in the encoded stream output from the VLC unit 15 by the first quantization matrix information supplied from the matrix selector 42. This is because, since the quantization matrix information described in the encoded stream output from the VLC unit 15 relates to the second quantization matrix, if the matrix unit 41 outputs the encoded stream without rewriting it, the inverse quantizer 33 in the decoder 30 uses the second quantization matrix to perform inverse quantization.

As a result of encoding, in the encoded stream to be supplied to the decoder 30, information on the first quantization matrix different from the second quantization matrix used by the quantizer 14 is described. The inverse quantizer 33 uses the first quantization matrix to inverse-quantize data processed by performing variable length decoding in the variable length decoder 32. In other words, the quantization matrix used by the inverse quantizer 33 differs from the second quantization matrix used by the quantizer 14.

In the case of complexity level 3, the matrix selector 42 selects and supplies the third quantization matrix (shown in FIG. 6) to the quantizer 14. The matrix selector 42 also supplies information on the first quantization matrix, as a quantization matrix to be used for inverse quantization, to the matrix unit 41. The quantizer 14 performs quantization by using the third quantization matrix supplied from the matrix selector 42.

The matrix unit 41 rewrites the quantization matrix information described in the encoded stream output from the VLC unit 15 by the first quantization matrix information supplied from the matrix selector 42. This is because, since the quantization matrix information described in the encoded stream output from the VLC unit 15 relates to the third quantization matrix, if the matrix unit 41 outputs the encoded stream without rewriting it, the inverse quantizer 33 in the decoder 30 uses the third quantization matrix to perform inverse quantization.

As a result of encoding, in the encoded stream to be supplied to the decoder 30, information on the first quantization matrix different from the third quantization matrix used by the quantizer 14 is described. The inverse quantizer 33 uses the first quantization matrix to inverse-quantize data processed by performing variable length decoding in the variable length decoder 32. In other words, the quantization matrix used by the inverse quantizer 33 is the first quantization matrix different from the third quantization matrix used by the quantizer 14.

The reason that the second or third quantization matrix is used to perform quantization before inverse quantization is performed using the first quantization matrix having quantization coefficients less than those of the second or third quantization matrix, and effects of the quantization and inverse quantization, are described below. The following description is based on the condition that, among 64 DCT coefficients in the 8×8 DCT block, a DCT coefficient having the highest spatial frequency is quantized and inverse-quantized, and that the value of DCT coefficient "DCT_coefficient" is 280 and the value of quantization step "Q_step" is 1.

The quantization matrix used for quantization performed in the quantizer 14 is the second quantization matrix shown in FIG. 5 or the third quantization matrix shown in FIG. 6. In the second or third quantization matrix, a quantization coefficient for quantizing a DCT coefficient having the highest spatial frequency is 140. Therefore, based on the expression (1), data "Q_data" quantized by the quantizer 14 is expressed by the following expression:

$$Q\_data = DCT\_coefficient/(Q\_coefficient \times Q\_step) \quad (3)$$
$$= 280/(140 \times 1)$$
$$= 2$$

Quantized data computed by quantizing computation based on the expression (3) are described in the encoded stream output from the encoder 10.

Subsequently, when the encoded stream is inverse-quantized, the first quantization matrix shown in FIG. 4 is used. A quantization coefficient for quantizing a DCT coefficient in the first quantization matrix that has the highest spatial frequency is 70. DCT coefficient "DCT_coefficient" inverse-quantized by the inverse quantizer 33 is expressed by the following expression:

$$DCT\_coefficient = Q\_data \times (Q\_coefficient \times Q\_step) \quad (4)$$
$$= 2 \times (70 \times 1)$$
$$= 140$$

In other words, the DCT coefficient supplied to the quantizer 14 is 280, and the DCT coefficient output from the inverse quantizer 33 is 140, which is half of the DCT coefficient that has not been quantized. This shows that the level of the inverse-quantized DCT coefficient attenuates than the level of the DCT coefficient that has not been quantized. This also shows that the level of the inverse-quantized DCT coefficient is suppressed compared to the level of the DCT coefficient that has not been quantized.

The attenuation ratio of the inverse-quantized DCT coefficient to the DCT coefficient that has not been quantized is determined by the difference between the DCT coefficient of the first quantization matrix and the DCT coefficient of the second or third quantization matrix. Concerning the DCT coefficients in low to intermediate spatial-frequency ranges, the first quantization matrix and the second or third quantization matrix have the same quantization coefficients. Thus, there are almost no changes between DCT coefficients that have not been quantized and inverse-quantized DCT coefficients. Concerning the DCT coefficients in intermediate to high spatial-frequency ranges, the first quantization matrix and the second or third quantization matrix have different quantization coefficients. Thus, the attenuation ratio of the inverse-quantized DCT coefficient to the DCT coefficient that has not been quantized is determined in accordance with the difference. In the first quantization matrix shown in FIG. 4 and the second quantization matrix shown in FIG. 5, as a DCT coefficient has a higher spatial frequency, the attenuation ratio of the inverse-quantized DCT coefficient is greater.

Accordingly, by reducing quantization coefficients in a quantization matrix for inverse quantization to be smaller than quantization coefficients in a quantization matrix for quantization, the level of DCT coefficients obtained from high spatial-frequency components such as noises can be suppressed. Therefore, even if source video data including high spatial-frequency components such as noises are repeatedly encoded and decoded, enhancement of the noises can be prevented.

The selection of the quantization matrix is described below.

As described above, the quantization matrix used by the quantizer 14 is changed based on the amount of generated codes output from the VLC unit 15. However, in the case where the amount of generated codes varies in the vicinity of a predetermined threshold value, quantization matrices are frequently changed, which hinders the noise-eliminating state of image data from changing qualitatively (irregularity occurs in noise elimination determined by frequently changing the quantization step for high spatial-frequency components).

Accordingly, in order to prevent the quantization matrices from being frequently changed, the quantization matrix being used is not simply changed at a threshold value, but the changing operation of the quantization matrix can be set to have hysteresis characteristics as shown in FIG. 7.

A process for rewriting the quantization matrix is described with reference to the flowchart shown in FIG. 8. First, in step S1, the matrix selector 42 initially sets the level of complexity to complexity level 1. In step S2, the matrix selector 42 selects the first quantization matrix corresponding to complexity level 1. In step S3, the quantizer 14 uses the first quantization matrix to quantize each picture (one video frame). In step S4, based on the amount of generated codes that is temporarily stored in the output buffer 16, the controller 17 computes the mean "MEAN-Q" of the quantization indices as an indicator of the complexity of the encoded picture.

In step S5, the matrix selector 42 determines the level of complexity by comparing the mean MEAN-Q and quantization-matrix rewriting threshold value Thij where Thij represents a threshold value at which the complexity of the quantization matrix is changed from complexity level j to complexity level i. Whenever one picture is encoded, steps S2 to S5 are repeatedly performed.

Figure 8:
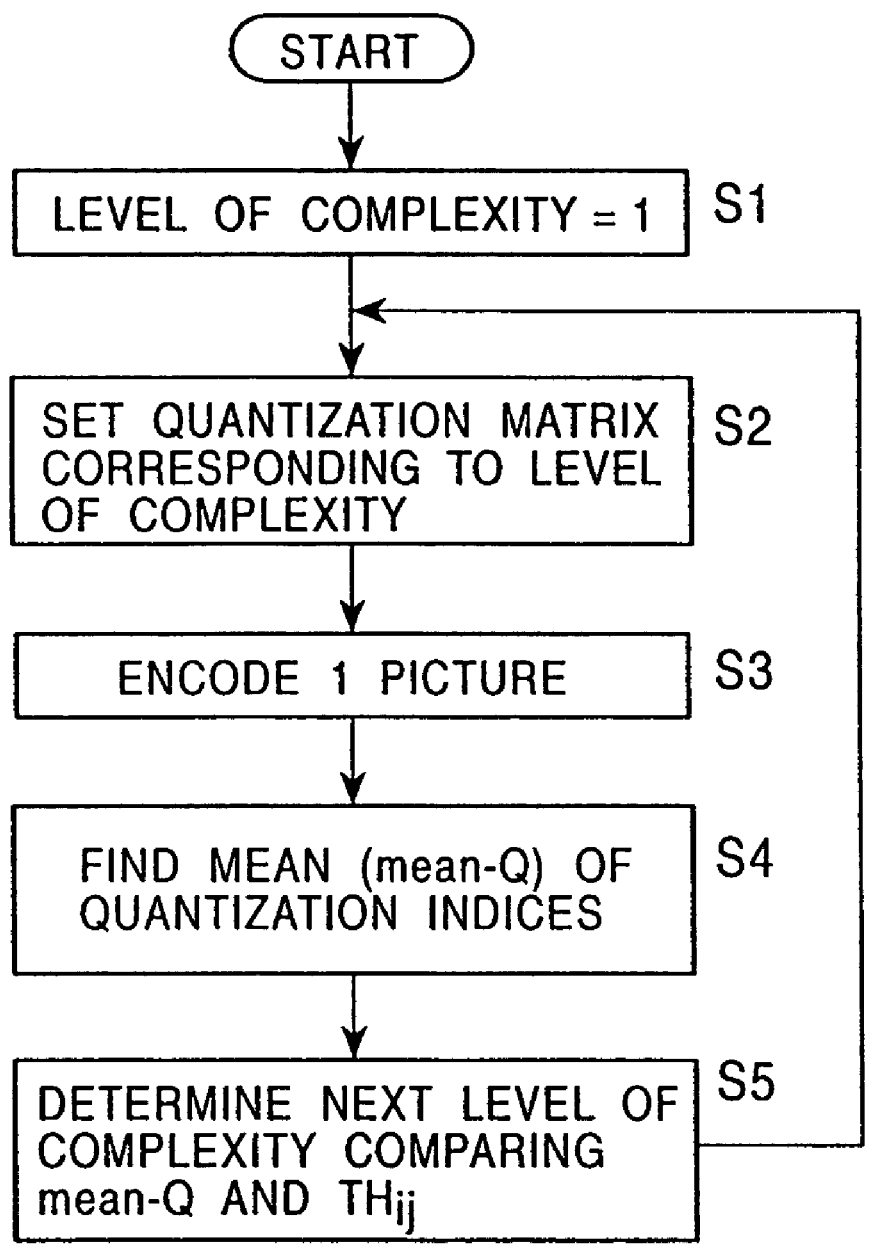
FIG. 8 is a flowchart illustrating a process for changing quantization matrices.

The complexity-level determination in step S5 of the flowchart in FIG. 8 is further described with reference to FIG. 7. When the mean of quantization indices increases in complexity level 1 to threshold value Th21 (a set value for changing the complexity of the quantization matrix from complexity level 1 to the complexity level 2), the quantization matrix for complexity level 1 is changed to the quantization matrix for complexity level 2. Conversely, in the case where the mean of quantization indices decreases in complexity level 2 to threshold value Th21, when the mean decreases to smaller threshold value Th12 (a set value for changing the complexity of the quantization matrix from complexity level 2 to complexity level 1), with the level of complexity unchanged from complexity level 2 to complexity level 1, the level of complexity is changed from complexity level 2 to complexity level 1. The distance between threshold value Th12 and threshold value Th21 is called "hysteresis distance". By setting the hysteresis distance, the complexity of quantization matrix cannot be simply changed, even when the mean of the quantization indices varies in the vicinity of a threshold value (e.g., Th21). The hysteresis distance is preset based on the mean of quantization indices, etc. This similarly applies to determination in the case where complexity level 2 is changed to complexity level 3, determination in the case where complexity level 1 is changed to complexity level 3, and the inverse case.

Instead of setting the hysteresis characteristics, as described above, the quantization coefficients can be gradationally (fine) changed so as to correspond to the mean of the quantization matrices.

Figure 9:
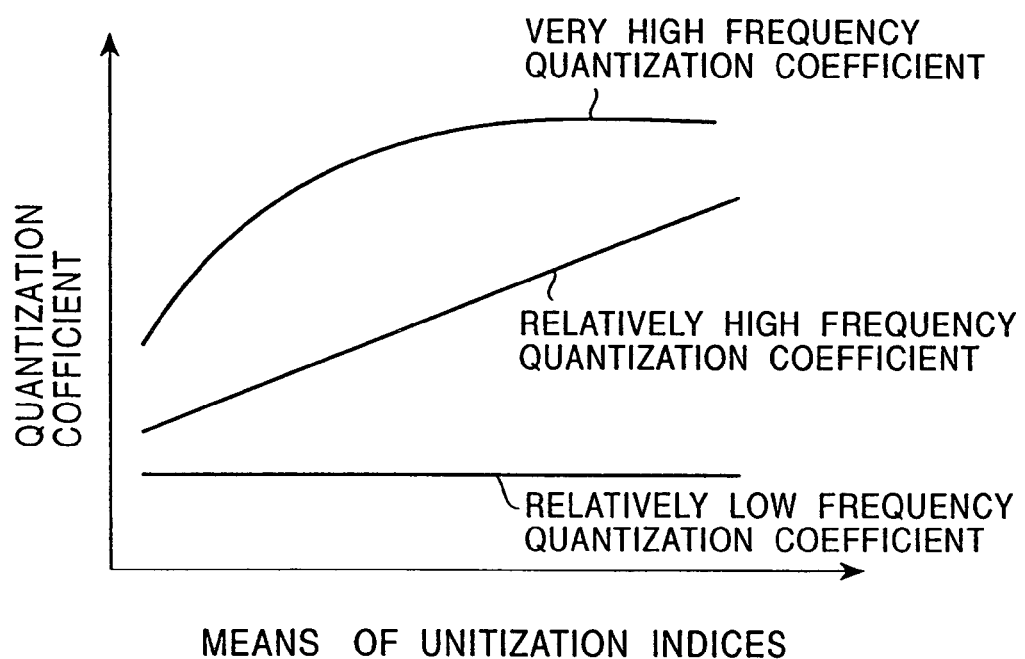
FIG. 9 is a graph showing an example of a function of gradationally changing quantization coefficients in a quantization matrix.

The gradational change of the quantization coefficients is realized by causing the matrix selector 42 to have, as the function shown in FIG. 9, the relationship between the quantization coefficients and the quantization indices.

In the case shown in FIG. 9, by providing three functions for spatial frequencies corresponding to quantization steps in a quantization matrix so that the means of quantization indices are correlated with the quantization steps, the quantization steps are gradationally changed in accordance with the means of the quantization indices. In this case, the quantization steps are not rapidly changed. Thus, this eliminates the need for performing determination with hysteresis characteristics taken into consideration as shown in FIG. 7.

Changing the quantization matrices is intended to cause the quantization matrices used in the quantizer 14 and the inverse quantizer 33 to be different. Accordingly, it is not inevitable to provide, in the encoder 10, the function (e.g., the matrix unit 41 shown in FIG. 3) of changing quantization matrices.

Figure 10:
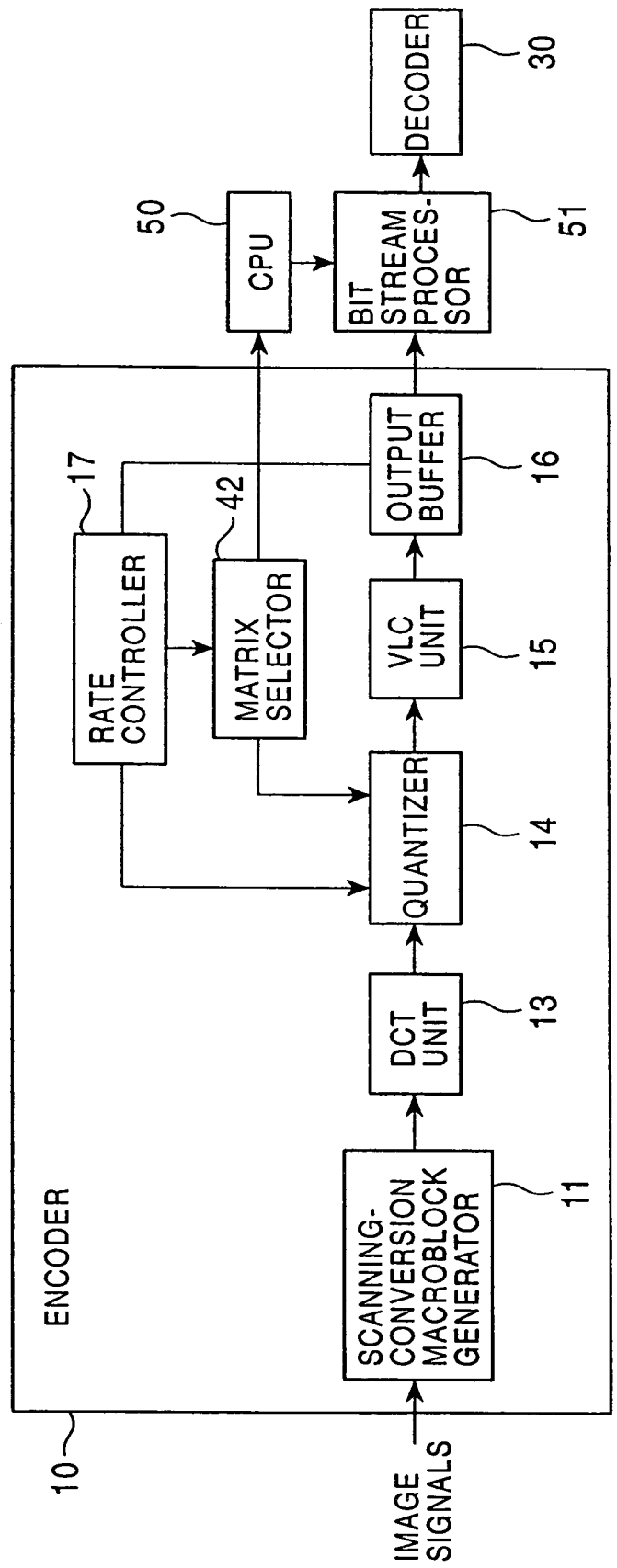
FIG. 10 is a block diagram showing an encoder 10 according to an embodiment of the present invention.

For example, the function of changing the quantization matrices may be provided outside the encoder 10, as shown in FIG. 10.

In the encoder 10 shown in FIG. 10, the matrix unit 41 shown in FIG. 1 is omitted, and a central processing unit (CPU) 50 for transmitting a changing quantization matrix to a bit stream processor 51 is provided in a stage after the output buffer 16. The bit stream processor 51 finds data of a quantization matrix described in a sequence layer by analyzing the stream output from the output buffer 16, and rewrites the quantization matrix by a quantization matrix selected by the matrix selector 42 using the CPU 50.

The bit stream consists of six layers of multiplexed data, as shown in FIG. 11. Among the six data layers, a sequence layer stores data of a group of pictures having a series of the same properties (e.g., image size, image rate, etc.), a GOP layer stores data in a minimum unit (e.g., a time from the start of a sequence) of a picture group that is a unit of random access, a picture layer stores data having common properties (e.g., picture type) of one picture, a slice layer stores common data (e.g., quantization characteristic values) of small pictures formed by dividing one picture so as to have an arbitrary length, a macroblock layer stores common data (e.g., motion vectors) of macroblocks formed by further dividing the slice layer, and a block layer stores transform coefficients.

The sequence layer further stores data of eighteen types, as shown in FIG. 12. The start code of the sequence layer is stored in a sequence header code (SHC). The number of horizontal pixels of an image is stored in a horizontal size (HS). The number of vertical lines of pixels is stored in a vertical size (VS). An aspect ratio of pixel distances is stored in a pel aspect ratio (PAR). The display cycle of images is stored in a picture rate (PR). The number of bits per second is stored in a bit rate (BR). Marker bit "1" is stored in a marker bit (MB). A parameter for determining the size of a virtual buffer for controlling the amount of generated codes is stored in a video-buffering-verifier (VBV) buffer size (VBS). A flag indicating that each parameter is within a limit is stored in a constrained parameters flag (CPF). A flag indicating the existence of a quantization matrix for intra-macroblocks is stored in a load intra quantize matrix (LIQM). A flag indicating the existence of a quantization matrix for non-intra-macroblocks is stored in a load non-intra quantizer matrix (LNIQM). A quantization matrix for non-intra-macroblocks is stored in a non-intra quantizer matrix (NIQM). The start code of extended data is stored in an extension start code (ESC). The start code of user data is stored in a user data start code (UDSC). User data is stored in user data (UD). The termination code of a sequence is stored in a sequence end code (SEC).

Data on quantization matrix data are stored in the IQM and NIQM shown in FIG. 12.

In other words, the bit stream processor 51 performs processing for using a quantization matrix transmitted from the external CPU 50 to reset the quantization matrix data stored in the IQM or NIQM.

Figure 2:
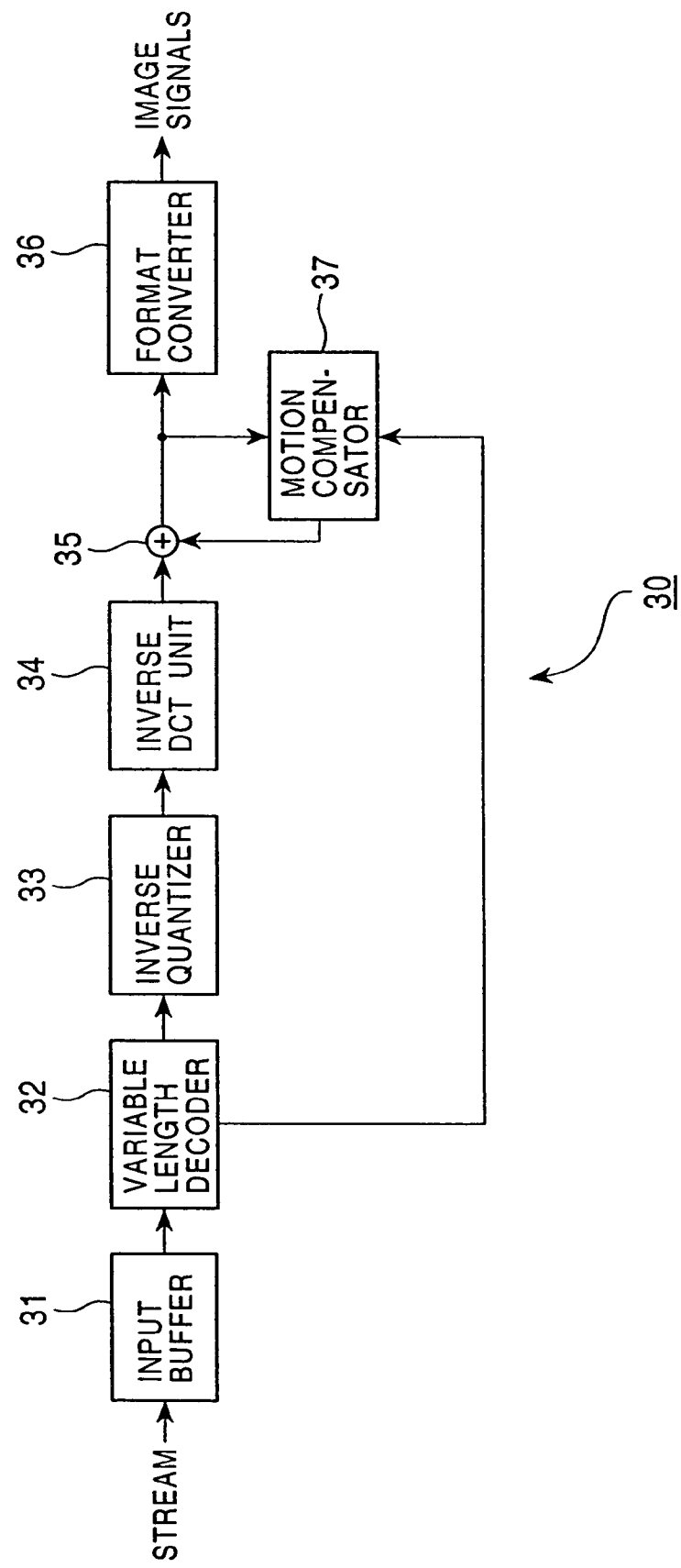
FIG. 2 is a block diagram showing a general decoder 30.

The data encoded by the above-described encoder 10 are decoded by a decoder having a structure similar to that of the conventional decoder 30 shown in FIG. 2.

Figure 13:
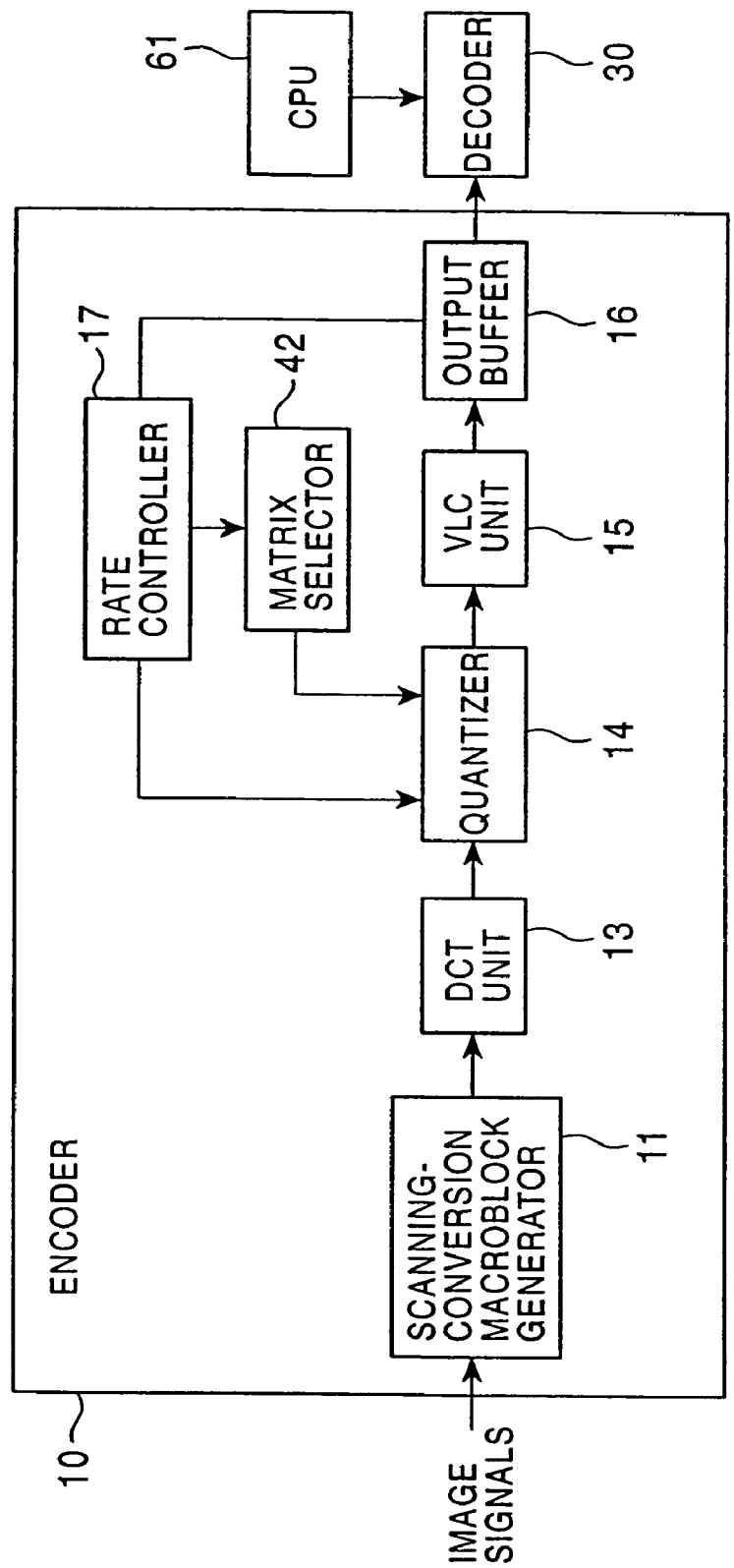
FIG. 13 is a block diagram showing an encoder 10 according to an embodiment of the present invention.

In a general decoder in which the quantization matrix used in the inverse quantizer 33 is fixed, the function of rewriting the quantization matrix can be substantially omitted. Its structure is described with reference to FIG. 13. An externally provided CPU 61 directly sets, for the inverse quantizer 33, a quantization matrix to be used in the inverse quantizer 33, while ignoring a quantization matrix used by a quantizer 14 which is stored in the bit stream. This also enables the execution of processing similar to that in the above-described case.

Although encoders for implementing intra-encoding have been described, the present invention can be applied to also a general encoder for also implementing P pictures and B pictures. The structure of this example is described with reference to FIG. 14.

Figure 14:
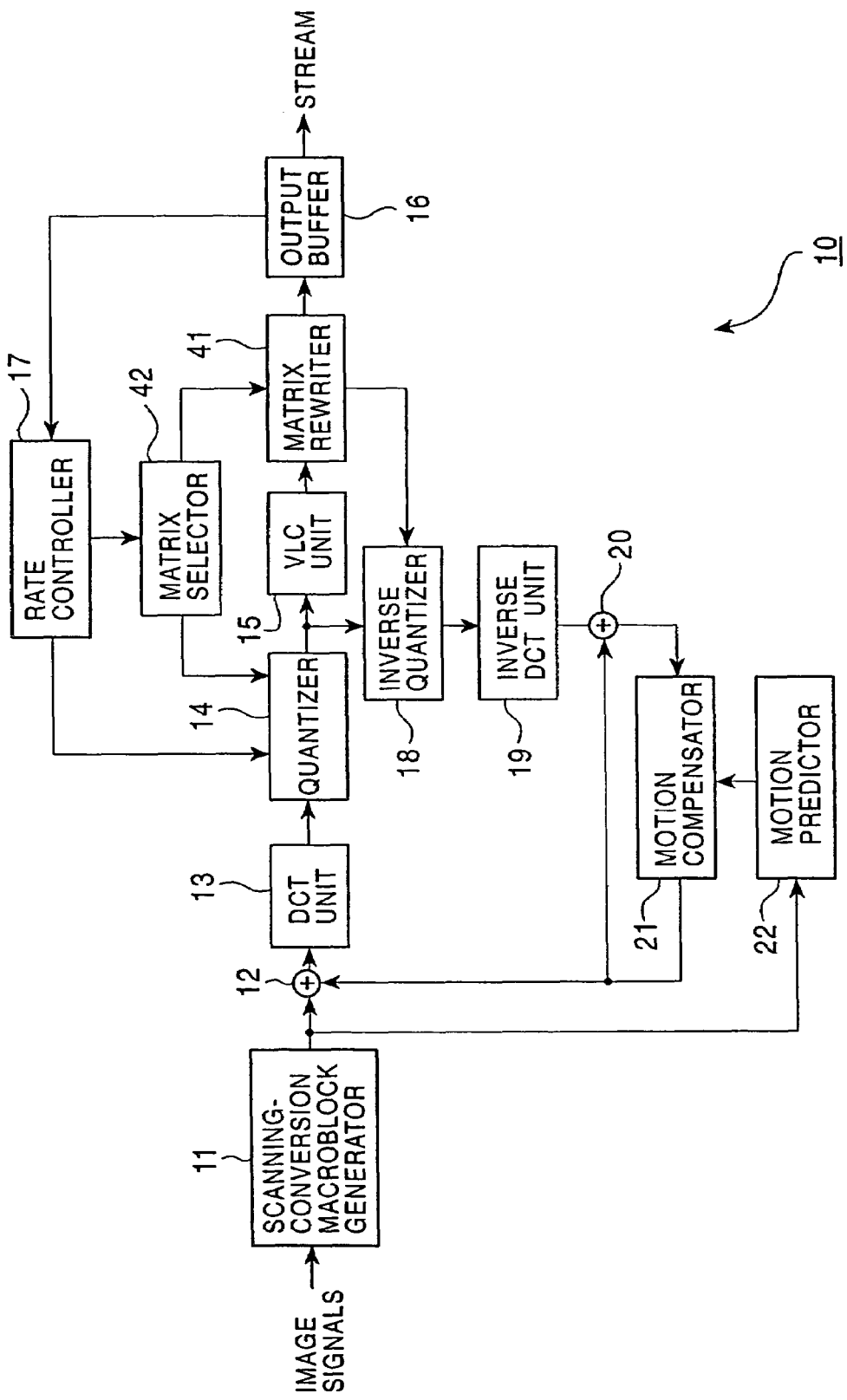
FIG. 14 is a block diagram showing an encoder 10 according to an embodiment of the present invention.

An encoder 10, shown in FIG. 14, differs from the encoder 10 shown in FIG. 1 in that the encoder 10 (shown in FIG. 14) has a motion-compensation predicting function (an adder 12, an inverse quantizer 18, and a motion predictor 22). Since this function is similar in the decoder 30 described with reference to FIG. 2, its description is omitted. In the motion-compensation predicting function, quantized data output from the quantizer 14 are inverse-quantized and used for motion-compensation prediction. Accordingly, in order that the difference between the quantization matrix used for encoding and the quantization matrix used for decoding may not generate a drift (accumulation of errors) in motion-compensation prediction, it is necessary to change also the quantization matrix used by the inverse quantizer 18 to a changing quantization matrix (identical to the quantization matrix used by the inverse quantizer 33 in the decoder 30 shown in FIG. 2) for rewriting by the matrix unit 41. This function is realized such that the matrix switch 41 sets the rewritten quantization matrix for also the inverse quantizer 18.

In the foregoing description, the mean of quantization indices which is computed based on the amount of generated codes of a bit stream generated from previous image data is used in order to determine the quantization matrix to be used by the quantizer 14. However, data representing the difficulty of image encoding can be used.

The difficulty of image encoding is described. The difficulty of image encoding represents the difficulty of picture encoding, which is, in other words, a factor of the amount of data required to maintain the same image quality when encoding was performed. There are types of way for expressing the difficulty of encoding in numerals. Parameters for computing the difficulty of encoding include a motion estimation (ME) residual, an intra-AC, activity, and flatness.

The intra-AC is defined as the sum of the square of each pixel level in an 8×8 pixel DCT block and the square of a difference of the pixel level from the mean of the pixel levels. It represents complexity of a picture pattern, and is computed based on, for example, the distribution of pixel levels for brightness signals based on an original image. It is used to compute quantized values of macroblocks in the TM5 (Test Model Edition Committee: "Test Model 5"; ISO/IEC JTC/SC292/WG11/N0400 (April 1993)), etc.

Flatness has correlation between the difficulty (difficulty level) of a video spatial image pattern and the amount of compressed data. As described above, the intra-AC and the activity represent the complexity of an image pattern. The ME residual represents the speed of a video motion and the complexity of a picture pattern. The flatness represents video spatial flatness. Because these factors are greatly correlative with the difficulty level of encoding, the use of a linear function having these factors as variables enables computation of the difficulty level of encoding. Here, statistically, the intra-AC is expressed by the following expression:

$$\text{Intra\_AC} = \Sigma |(f\,curr(x,y) - (\Sigma f\,curr)/N)|$$

where Intra_AC represents intra-AC, f curr(x,y) represents the level of each pixel in a DCT block, Σ f curr represents a total of pixel levels in the DCT block, N represents the number of pixels in the DCT block, and Σ represents a total of pixel levels in the DCT block.

The present inventor has proposed, as a technique for expressing the difficulty level of encoding in more accurate numerals, a method of updating in every moment a conversion formula for conversion into the difficulty level of encoding, from global complexity as a parameter defined in, e.g., the TM5, which represents image complexity in the same type of picture previously encoded. The present inventor has proposed also statistics (the ME residual, the activity, the flatness, and the intra-AC) acquired (hereinafter referred to as "pre-read") before implementing encoding. In this method, for example, whenever one picture is compressed, weight coefficients for approximation of encoded difficulty level data are computed by diving the global complexity by pre-read statistics, and weight coefficients used for arithmetic operations are updated. By updating the weight coefficient, a weight coefficient most suitable for the pattern of video data can be used, and high precision approximation of the difficulty level of encoding can be performed using pre-read statistics.

What is claimed is:

1. An encoding apparatus for encoding source video data, comprising:
   discrete-cosine-transform means for outputting discrete-cosine-transform coefficients by implementing discrete-cosine-transform processing on the source video data;
   quantization means for outputting quantized data by using a quantization matrix determined by a quantization index to quantize the discrete-cosine-transform coefficients;
   a rate controller for determining complexity level of output encoded video data and generating a respective quantization index corresponding to said complexity level;
   a matrix unit for rewriting said quantization matrix; and
   encoding means for outputting an encoded stream by encoding the quantized data, together with information representing the rewritten quantization matrix;
   wherein the quantization matrix used by said quantization means for quantization has quantization coefficients different from those in the rewritten quantization matrix used when inverse quantization in decoding is implemented.

2. An encoding method for encoding source video data, comprising the steps of:
   outputting discrete-cosine-transform coefficients by implementing discrete-cosine-transform processing on the source video data;
   outputting quantized data by using a first quantization matrix determined by a quantization index to quantize the discrete-cosine-transform coefficients;
   determining complexity level of output encoded video data and generating a respective quantization index corresponding to said complexity level;
   rewriting said first quantization matrix; and
   outputting an encoded stream by encoding the quantized data, together with information representing the rewritten quantization matrix;
   wherein the quantization matrix used for quantization has quantization coefficients different from those in the rewritten quantization matrix used when inverse quantization is implemented in decoding.

* * * * *